(12) United States Patent
Pursifull

(10) Patent No.: US 9,636,973 B2
(45) Date of Patent: May 2, 2017

(54) EXHAUST THROTTLING FOR CABIN HEATING

(71) Applicant: Ford Global Technologies, LLC, Dearborn, MI (US)

(72) Inventor: Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/226,826

(22) Filed: Aug. 2, 2016

(65) Prior Publication Data

US 2016/0339764 A1 Nov. 24, 2016

Related U.S. Application Data

(63) Continuation of application No. 14/072,334, filed on Nov. 5, 2013, now Pat. No. 9,404,409.

(51) Int. Cl.
| | |
|---|---|
| *F02M 25/07* | (2006.01) |
| *F01N 5/02* | (2006.01) |
| *B60H 1/20* | (2006.01) |
| *F02D 9/04* | (2006.01) |
| *F02D 21/08* | (2006.01) |
| *F02D 41/00* | (2006.01) |
| *F02M 26/05* | (2016.01) |

(Continued)

(52) U.S. Cl.
CPC .............. *B60H 1/20* (2013.01); *F01N 5/02* (2013.01); *F01N 11/002* (2013.01); *F01P 3/20* (2013.01); *F02D 9/04* (2013.01); *F02D 21/08* (2013.01); *F02D 41/0065* (2013.01); *F02D 41/0077* (2013.01); *F02M 26/05* (2016.02); *F02M 26/06* (2016.02); *F02M 26/07* (2016.02); *F02M 26/10* (2016.02); *F02M 26/24* (2016.02); *F02M 26/27* (2016.02); *F02M 26/30* (2016.02); *F02M 26/44* (2016.02); *F02P 5/15* (2013.01); *F01N 2550/02* (2013.01); *F01P 2060/08* (2013.01); *F02D 2200/0802* (2013.01); *F02D 2700/04* (2013.01); *F02M 26/47* (2016.02); *F02N 2200/0804* (2013.01); *Y02T 10/47* (2013.01)

(58) Field of Classification Search
CPC .... F01P 2025/08; F01P 2060/08; F01P 7/164; F02D 2041/0067; F02M 25/0728; F02M 25/0731; F02M 25/0738
USPC ..................................................... 123/568.12
See application file for complete search history.

(56) References Cited

U.S. PATENT DOCUMENTS

| | | |
|---|---|---|
| 5,860,595 A | 1/1999 | Himmelsbach |
| 2009/0321533 A1 | 12/2009 | Bigler et al. |

(Continued)

FOREIGN PATENT DOCUMENTS

WO 2008125762 A1 10/2008

*Primary Examiner* — Hieu T Vo
*Assistant Examiner* — Arnold Castro
(74) *Attorney, Agent, or Firm* — Julia Voutyras; McCoy Russell LLP

(57) ABSTRACT

Embodiments for heating a vehicle cabin are disclosed. In one example, a method for heating a vehicle cabin comprises closing an exhaust throttle while diverting at least a portion of throttled exhaust gas through an exhaust gas recirculation (EGR) cooler coupled upstream of the throttle, and transferring heat from the EGR cooler to a heater core configured to provide heat to the vehicle cabin. In this way, exhaust heat may be directly routed to the cabin heating system.

20 Claims, 5 Drawing Sheets

(51) Int. Cl.
  *F02M 26/06* (2016.01)
  *F02M 26/10* (2016.01)
  *F02M 26/27* (2016.01)
  *F02M 26/24* (2016.01)
  *F02M 26/44* (2016.01)
  *F02M 26/07* (2016.01)
  *F02M 26/30* (2016.01)
  *F01N 11/00* (2006.01)
  *F01P 3/20* (2006.01)
  *F02P 5/15* (2006.01)
  *F02M 26/47* (2016.01)

(56) References Cited

U.S. PATENT DOCUMENTS

| | | |
|---|---|---|
| 2012/0036848 A1 | 2/2012 | Quix et al. |
| 2012/0180452 A1 | 7/2012 | Caine |
| 2012/0216767 A1 | 8/2012 | Ulrey et al. |
| 2013/0047607 A1 | 2/2013 | Petrovic et al. |
| 2014/0196454 A1 | 7/2014 | Ulrey et al. |
| 2014/0196699 A1 | 7/2014 | Ulrey et al. |
| 2014/0318514 A1 | 10/2014 | Pursifull |
| 2015/0047317 A1 | 2/2015 | Ulrey et al. |
| 2015/0047618 A1 | 2/2015 | Ulrey et al. |
| 2015/0121847 A1 | 5/2015 | Pursifull |
| 2015/0121848 A1 | 5/2015 | Pursifull |
| 2016/0363023 A1* | 12/2016 | Ulrey .................... F01N 3/2006 123/568.12 |

* cited by examiner

EXHAUST THROTTLING FOR CABIN HEATING

CROSS REFERENCE TO RELATED APPLICATIONS

The present application is a continuation of U.S. patent application Ser. No. 14/072,334, entitled "EXHAUST THROTTLING FOR CABIN HEATING," filed on Nov. 5, 2013, now U.S. Pat. No. 9,404,409, the entire contents of which are hereby incorporated by reference for all purposes.

FIELD

The present disclosure relates to a system for heating a cabin of a motor vehicle.

BACKGROUND AND SUMMARY

Rapid cabin heating of a motor vehicle is desired, particularly during cold ambient conditions, to provide passenger comfort. Classically, cabin heat comes from the engine coolant, which may be heated indirectly via a massive increase in exhaust heat. However, such a method is energy inefficient and wastes fuel, as only a small fraction of the exhaust heat appears in the engine coolant.

The inventors have recognized that exhaust heat whose route is altered by throttling the exhaust may be recovered and directly routed to the cabin heating system rather than indirectly routed to the cabin heating system via the engine coolant system. Accordingly, a method for heating a vehicle cabin is provided, comprising closing an exhaust throttle while diverting at least a portion of throttled exhaust gas through an exhaust gas recirculation (EGR) cooler coupled upstream of the throttle, and transferring heat from the EGR cooler to a heater core configured to provide heat to the vehicle cabin.

In this way, the exhaust may be throttled to route the exhaust flow through an EGR cooler, and the exhaust heat may be transferred to the cabin heating system coolant via the EGR cooler. By doing so, the cabin heating system heater core may be provided with early exhaust heat directly, rather than the early exhaust heat being dissipated via the engine and contacting surfaces. As such, energy used to heat the vehicle cabin may be reduced, increasing fuel economy.

Thus, in the above-described method, exhaust heat may be prioritized for cabin heating over engine heating. In fact, the engine coolant could be ice cold and this system would still provide cabin heat extracted from engine exhaust. This may have multiple advantages. First, it provides rapid cabin heating at start. Second, it provides an effective method of getting the exhaust heat to the cabin heater core, which is crucial for idling conditions in cold ambient temperatures. Further, when enough coolant heat is available for cabin heating, the system works conventionally. In this conventional case, one would cease to throttle the exhaust to route it through the EGR cooler. Should EGR cooling be called for, the cabin has first priority use of this extracted heat. If cabin heat is not called for, the heat is added to the coolant system.

Further, in some examples, exhaust condensation in the exhaust to a water heat exchanger may be intentional. This gives improved heat transfer from the exhaust to heat exchanger due to the heat of vaporization. In some examples, the controller may adjust operation so the exhaust flow is not allowed to flow into the engine intake system (EGR) until the heat exchanger's (EGR cooler) temperature is high enough to avoid condensation. But exhaust condensation in the exhaust path is an occurrence on most, if not all, engine starts.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
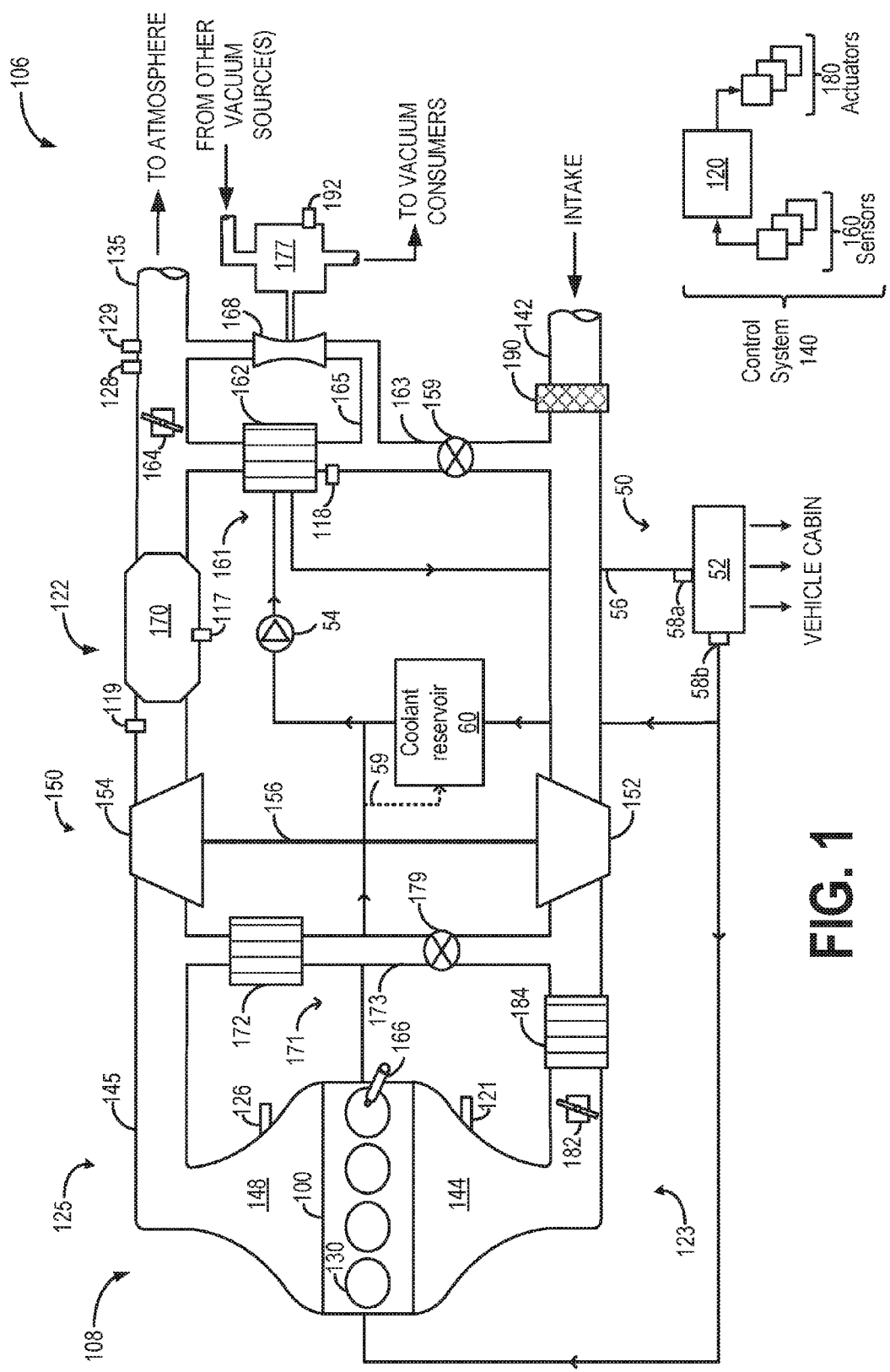
FIG. 1 shows a schematic depiction of an engine system.

Methods and systems are provided for expediting heater core warm-up in a vehicle engine, such as the engine system of FIG. 1. During an engine cold-start and warm-up, synergistic benefits of increased exhaust backpressure and subsequent heat rejection at an EGR cooler may be advantageously used to quickly raise coolant temperature provided to the heater core. The conventional approach to getting heat out of the exhaust and into engine coolant includes maximizing the coolant flow rate and minimizing the coolant volume (via isolating coolant branches such as the branch into the radiator).

However, in the claimed configuration, the coolant is sourced from the engine's general coolant system, passes through the heat pick up element (EGR cooler) and then passes through the heat sink (heater core), and is released into the engine's general coolant system. In this case, there is a given coolant flow rate that achieves maximum heat transfer into the heater core. That coolant flow rate is a function of the heater core temperature drop. The maximum heat is transferred when the product of the temperature drop across the heater core and flow rate are maximized.

Figure 2:
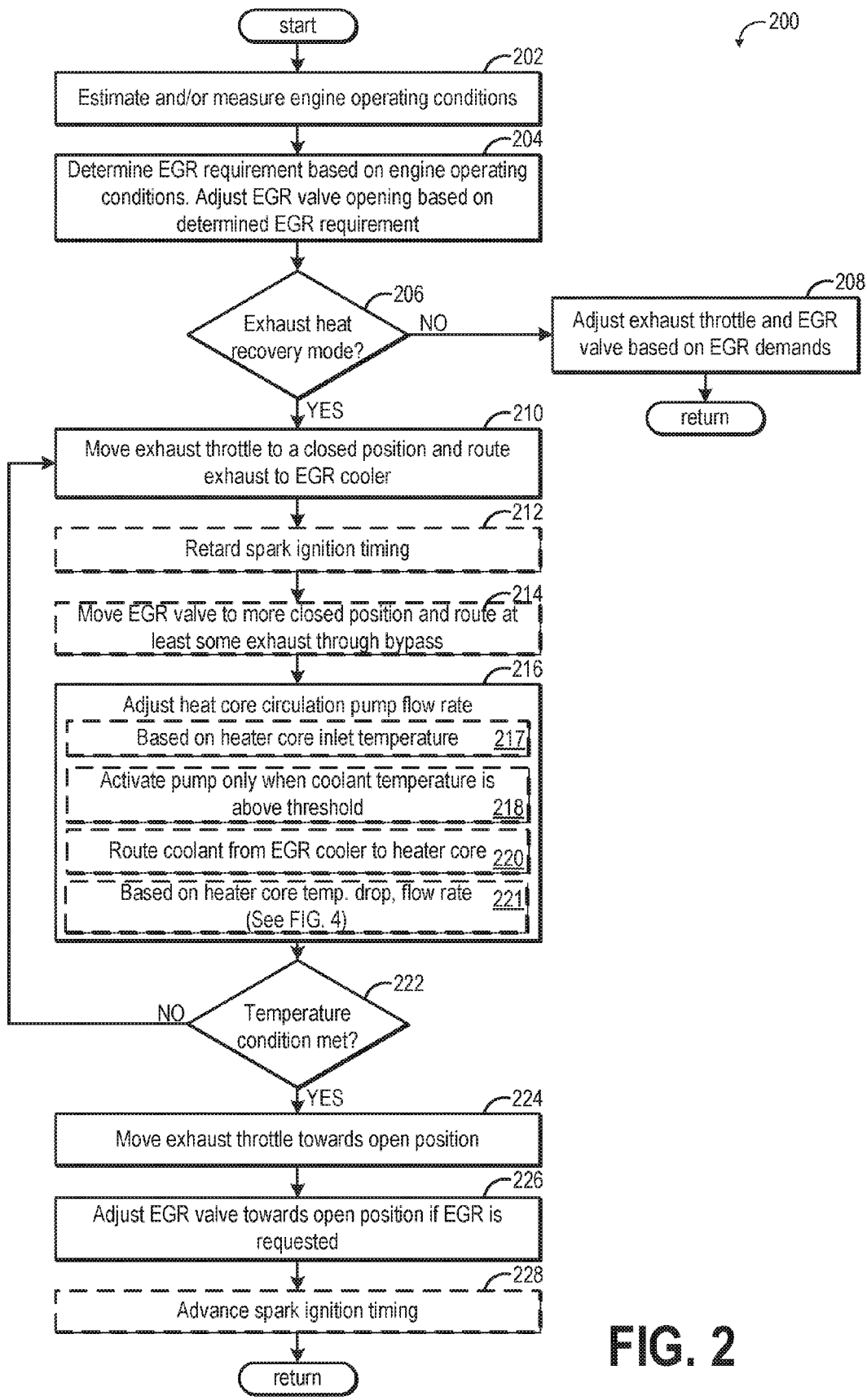
FIG. 2 shows a flow chart illustrating a method for heating a vehicle cabin according to an embodiment of the present disclosure.
Figure 3:
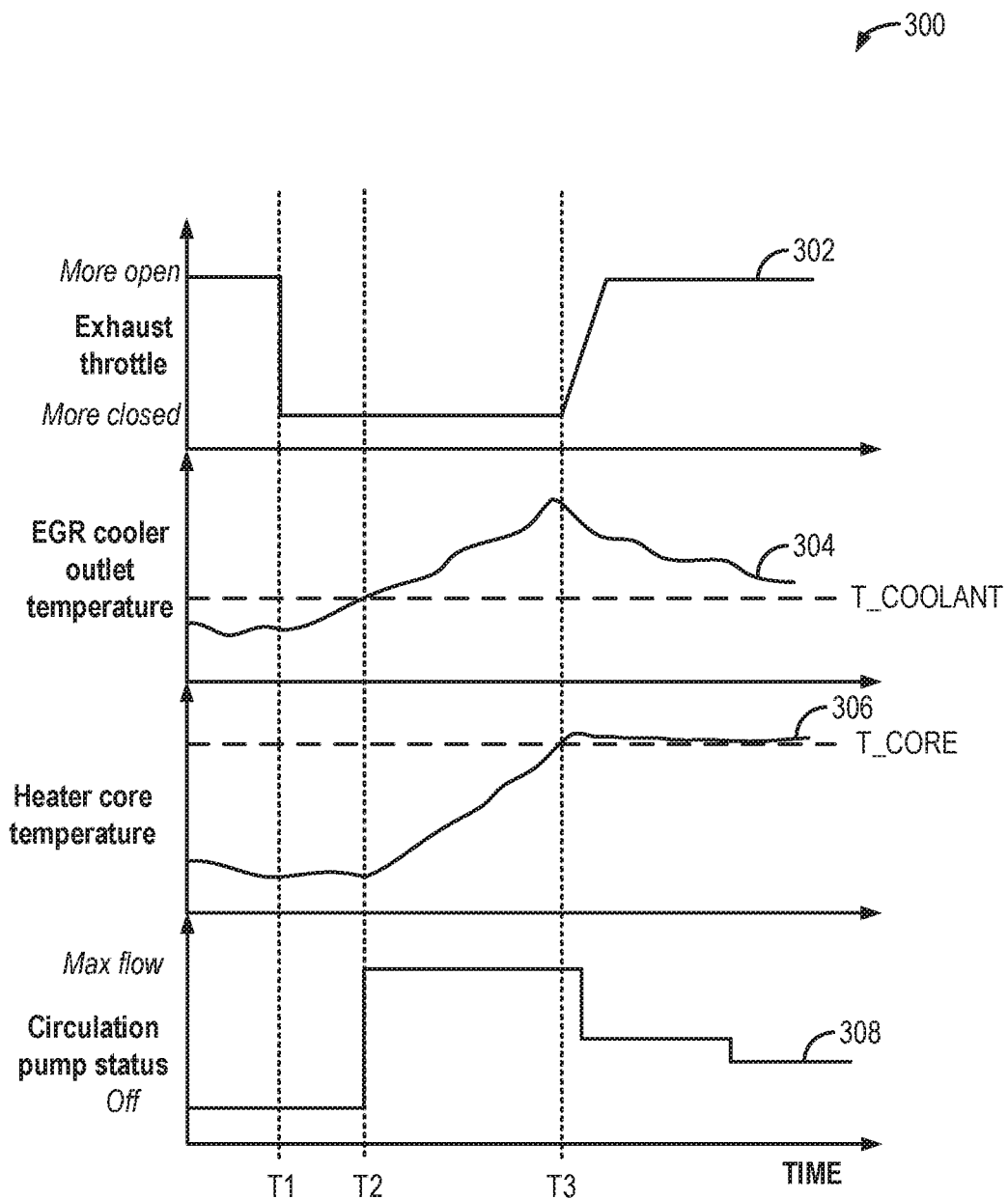
FIG. 3 shows an example exhaust throttle and heater core circulation pump adjustment for expediting heater core warm-up, according to the present disclosure.
Figure 4:
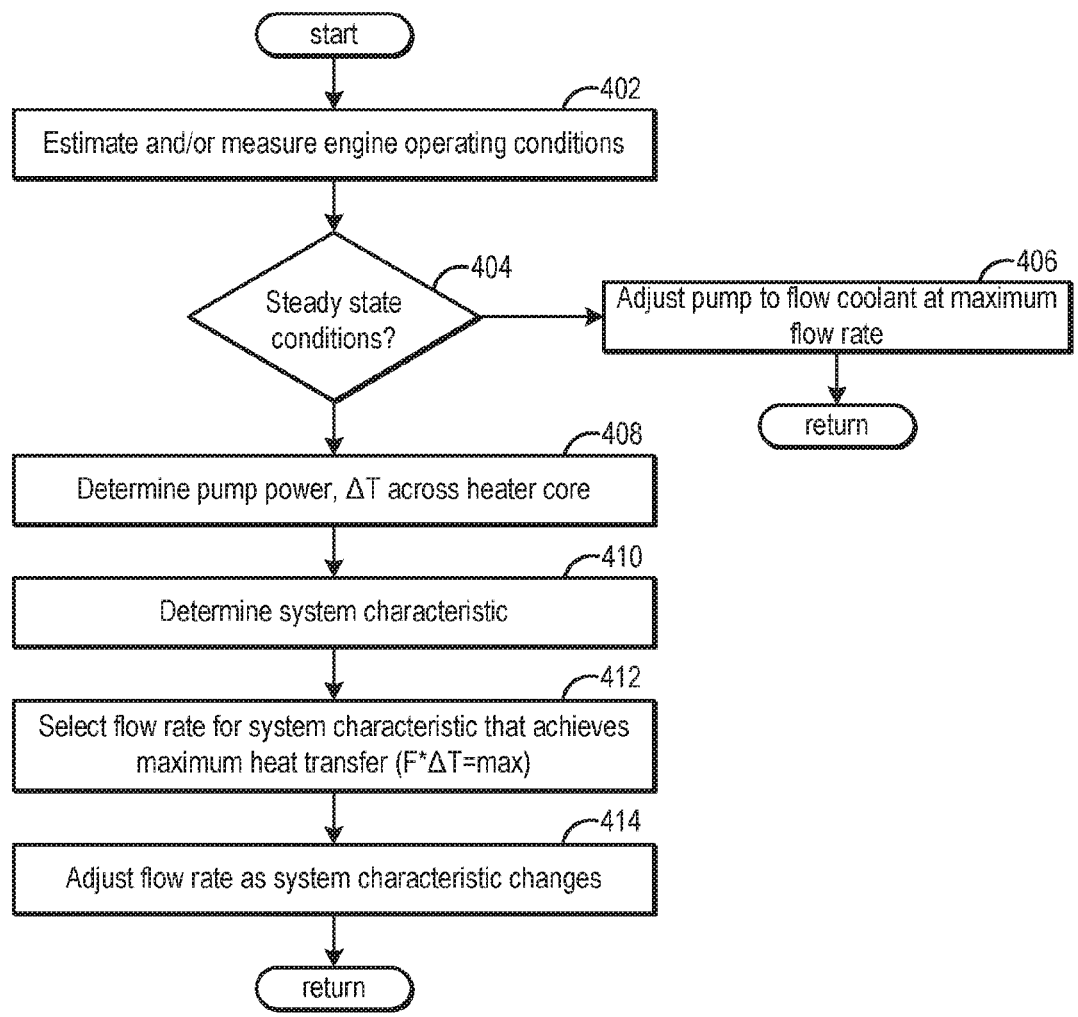
FIG. 4 shows a flow chart illustrating a method for maximizing heat transfer to a vehicle cabin according to an embodiment of the present disclosure.

A controller may be configured to perform a method, such as the example methods of FIGS. 2 and 4, to throttle an exhaust valve positioned downstream of an EGR passage take off to raise an exhaust backpressure while also closing an EGR valve to flow at least a portion of the throttled exhaust gas through an EGR cooler. By throttling the exhaust instead of diverting the exhaust, the exhaust gas gets increased residency time at the heat exchanger. There may be some tertiary effect of better heat transfer with higher pressure. The increased backpressure enables a rapid increase in engine temperature by trapping hot exhaust gas in engine cylinders, while flow of throttled exhaust gas through an EGR cooler enables an increase in coolant temperature via exhaust heat rejection at the EGR cooler. Example heater core circulation pump and exhaust throttle adjustments are described at FIGS. 3-4. Example system characteristics and flow rate selection parameters are described at FIGS. 5-6.

FIG. 1 shows a schematic depiction of a vehicle system 106. The vehicle system 106 includes an engine system 108, including engine 100 coupled to emission control system 122. Engine 100 includes a plurality of cylinders 130. Engine 100 also includes an intake 123 and an exhaust 125. Intake 123 may receive fresh air from the atmosphere through intake passage 142. Air entering intake passage 142 may be filtered by air filter 190. Intake passage 142 may include an air intake throttle 182 positioned downstream of an intake compressor 152 and an intake charge air cooler 184. Intake throttle 182 may be configured to adjust the flow of intake gas (e.g., boosted intake air) entering engine intake manifold 144. Exhaust 125 includes an exhaust manifold 148 leading to an exhaust passage 145 that routes exhaust gas to the atmosphere via tailpipe 135.

Engine 100 may be a boosted engine including a boosting device, such as turbocharger 150. Turbocharger 150 may include intake compressor 152, arranged along intake passage 142, and an exhaust turbine 154, arranged along exhaust passage 145. Compressor 152 may be at least partially driven by turbine 154 via shaft 156. The amount of boost provided by the turbocharger may be varied by an engine controller. In some embodiments, a bypass passage controlled via a wastegate (not shown) may be coupled across the exhaust turbine so that some or all of the exhaust gases flowing through exhaust passage 145 can bypass turbine 154. By adjusting the position of the wastegate, an amount of exhaust gas delivered through the turbine may be varied, thereby varying an amount of boost delivered to the engine intake.

In further embodiments, a similar bypass passage controlled via a bypass valve (not shown) may be coupled across the intake compressor so that some or all of the intake air compressed by compressor 152 can be recirculated into the intake passage 142 upstream of compressor 152. By adjusting the position of the compressor bypass valve, pressure in the intake system may be released during selected conditions to reduce the effects of compressor surge loading.

An optional charge air cooler 184 may be included downstream of compressor 152 in the intake passage to reduce the temperature of intake air compressed by the turbocharger. Specifically, after-cooler 184 may be included upstream of intake throttle 182 or integrated into the intake manifold 144.

Emission control system 122, coupled to exhaust passage 145, includes a catalyst 170. Catalyst 170 may include multiple catalyst bricks, in one example. In another example, multiple emission control devices, each with multiple bricks, can be used. Catalyst 170 can be a three-way type catalyst in one example. In other examples, catalyst 170 may be an oxidation catalyst, lean NOx trap, selective catalyst reduction (SCR) device, particulate filter, or other exhaust treatment device. While catalyst 170 is arranged downstream of turbine 154 in the embodiments described herein, in other embodiments, catalyst 170 may be arranged upstream of a turbocharger turbine or at another location in the engine exhaust passage without departing from the scope of this disclosure.

An exhaust throttle or backpressure valve 164 may be located in the exhaust passage, downstream of exhaust catalyst 170. In the embodiments described herein, controller 120 may control a position of exhaust throttle 164 based on various engine operating conditions and parameter values (e.g., engine cold start, stored vacuum level, shutdown, etc.). In other embodiments, the exhaust throttle, exhaust passage, and other components may be designed such that the exhaust throttle is mechanically controlled as needed during various engine operating conditions, without control system intervention. Exhaust throttle 164 may not simply bypass flow past EGR cooler 162, but may route the exhaust though a flow restrictive path that includes EGR cooler 162, bypass passage 165, exhaust passage 168, and tailpipe 135. Thus reducing the flow area of exhaust throttle 164 results in exhaust throttling as well as increasing flow through EGR cooler 162. As elaborated with reference to FIG. 2, exhaust throttle 164 may be selectively closed by controller 120 during engine cold-start conditions to rapidly raise an exhaust pressure and temperature. By throttling the exhaust valve, a larger amount of hot exhaust gas can be trapped in an engine cylinder, further raising an exhaust temperature and expediting the downstream exhaust catalyst reaching its activation temperature. The throttled exhaust gas may also be of increased pressure relative to non-throttled exhaust gas, leading to increased exhaust temperature and/or increased residence time in various exhaust components. Further, the hot exhaust gas may be routed through an EGR cooler positioned in an EGR passage coupling the engine exhaust to the engine intake. The EGR cooler may act as an exhaust-to-coolant heat exchanger to heat coolant that is routed to the cabin heating system heater core, thus expediting cabin heating. Note that any heat extracted from the EGR cooler is first available to the cabin's heater core and only if excess heat exists, does the heat transfer to the engine's cooling system.

As such, the improvement in heat transfer to the engine, exhaust catalyst, and cabin heating system heater core via throttling of the exhaust can be attributed to at least two effects. First, any given mass of exhaust gas has a higher residency time in the EGR cooler 162 because of the increase exhaust mass in the EGR cooler 162 due to its density increase. Said another way, when throttled, the high temperature exhaust gas spends more time in contact with the catalyst and EGR cooler, the desired recipients of the heat. Further, the expansion to atmosphere after traveling though the catalyst and EGR cooler potentially drops the temperature below ambient temperature, evidence of the effectiveness of taking out the heat while the pressure is still high . . . . In particular, by using a post-catalyst exhaust throttle, the time and temperature that a given mass of exhaust gas is in contact with engine parts is substantially increased. This expedites the catalyst activation. It will be appreciated that while the depicted embodiment achieves post catalyst expansion of the exhaust via an exhaust throttle, in alternate embodiments, the same may be achieved via a post-catalyst orifice in the engine exhaust passage 168.

Exhaust throttle 164 may be maintained in a fully open position (or wide open throttle) during most engine operating conditions, but may be configured to close to increase exhaust backpressure under certain conditions, as will be detailed below. In one embodiment, exhaust throttle 164 may have two restriction levels, fully open or fully closed. However, in an alternate embodiment, the position of exhaust throttle 164 may be variably adjustable to a plurality of restriction levels by controller 120.

As detailed herein, adjustments of exhaust throttle position may affect air flow through the engine. For example, a fully closed exhaust throttle may be conceptualized as a "potato in the tailpipe" which restricts exhaust flow, thereby causing an increase in exhaust backpressure upstream of the closed exhaust throttle. This increase in exhaust backpressure leads to a direct increase in exhaust heat transfer which may be advantageously used during selected conditions (e.g., during an engine cold-start and warm-up) to expedite warming of exhaust catalyst 170 and/or the cabin heating system. In some embodiments, while closing the exhaust throttle, spark timing may be retarded to further elevate exhaust temperatures, thereby further expediting catalyst activation.

To compensate for the effects of exhaust throttle adjustment on engine air flow, one or more other engine components may be adjusted. As an example, as the exhaust throttle closes, mass air flow may initially decrease, and thus an intake throttle (such as intake throttle 182) may be opened to admit more air to the engine to maintain engine speed and reduce torque fluctuation. In this way, while the exhaust throttle is used to manage backpressure, airflow may be controlled to limit an engine output torque. As another example, spark timing may be adjusted (e.g., advanced) while the exhaust throttle is closed to improve combustion stability. In some embodiments, valve timing adjustments may also be used (e.g., adjustments to an amount of valve overlap) in conjunction with throttle position adjustments to improve combustion stability. For example, intake and/or exhaust valve timings may be adjusted to adjust internal exhaust gas recirculation and increase combustion stability.

Vehicle system 106 further includes a low-pressure EGR (LP-EGR) system 161. LP-EGR system 161 includes an EGR passage 163 that couples exhaust passage 145, downstream of exhaust catalyst 170 and upstream of exhaust throttle 164, with air intake passage 142, upstream of compressor 152. An EGR cooler 162 arranged in EGR passage 163 cools exhaust gas flowing there-through, as will be detailed below. A position of EGR valve 159, located in EGR passage 163 on the intake passage side of EGR cooler 162 (e.g., downstream of the outlet of the EGR cooler 162), may be adjusted by controller 120 to vary an amount and/or rate of exhaust gas recirculated from the exhaust passage to the intake passage via the LP-EGR system. In some embodiments, one or more sensors may be positioned within LP-EGR passage 163 to provide an indication of one or more of a pressure, temperature, and air-fuel ratio of exhaust gas recirculated through the LP-EGR passage. For example, temperature sensor 118 may be coupled to an outlet (on the intake passage side) of EGR cooler 162 and may be configured to provide an estimate of an EGR cooler outlet temperature. As elaborated below, during an engine cold-start and warm-up, an opening of exhaust throttle 164 may be adjusted based on the EGR cooler outlet temperature to expedite heating of an engine temperature. Exhaust gas recirculated through LP-EGR passage 163 may be diluted with fresh intake air at a mixing point located at the junction of LP-EGR passage 163 and intake passage 142. Specifically, by adjusting a position of EGR valve 159, a dilution of the EGR flow may be adjusted.

As such, when EGR valve 159 is closed, at least a portion of exhaust gas may be directed through EGR cooler 162. As elaborated with reference to FIG. 2, by selectively increasing an amount of (hot) exhaust gas directed through EGR cooler 162, heat rejection at the EGR cooler may be increased. Since the EGR cooler is a heat exchanger configured to exchange with coolant that is fluidly coupled to an engine coolant system, the additional heat rejected at the EGR cooler may be used to heat coolant directed to the cabin heating system heater core, thereby heating the cabin. After passing through the heater core, the coolant may be routed to the engine coolant system, where it may pass through the engine and/or one or more heat exchangers. By using this heat rejection to increase heater core temperature during selected operating conditions, such as during an engine cold-start and warm-up, exhaust catalyst activation can be expedited while also providing cabin heat during a cold-start. As such, this provides a more effective way of recovering latent heat from the water in the exhaust. While the exhaust is condensing, it may be routed through the heat exchanger and back to the exhaust pipe. While the exhaust is non-condensing, it is available for LP-EGR. (Typically it is desired to keep liquid out of the engine air ducts.) While the EGR valve 159 is open, it may be necessary to run pump 54 at a computed flow rate to prevent coolant boiling in the EGR cooler 162.

A bypass passage 165 may be included in vehicle system 106 to fluidly couple EGR passage 163 with exhaust passage 145. In particular, bypass passage 165 may couple EGR passage 163, on the intake passage side of EGR cooler 162, with exhaust passage 145, downstream of exhaust throttle 164 (substantially in tailpipe 135). Bypass passage 165 enables at least a portion of exhaust gas to be released to the atmosphere upon passage through EGR cooler 162. In particular, during conditions when EGR valve 159 is closed, exhaust gas (such as throttled exhaust gas generated upon closing of throttle 164) may be directed into EGR passage 163, then into EGR cooler 162, and then to tailpipe 135 via bypass passage 165. By venting some exhaust gas via bypass passage 165 when EGR valve 159 is closed, an exhaust pressure in EGR passage 163 (upstream of and at EGR cooler 162) can be maintained within limits. As such, this reduces damage to components of the LP-EGR system. In comparison, during conditions when EGR valve 159 is open, based on the degree of opening of EGR valve 159 and exhaust throttle 164, and further based on an amount of EGR requested and a ratio of intake to exhaust manifold pressure, exhaust gas may flow from upstream of exhaust throttle 164 to downstream of EBV 164, via EGR cooler 162 and bypass passage 165, or from downstream of exhaust throttle 164 to the intake passage side of EGR cooler 162 via intermediate passage 165. Because EGR may be flown for the sake of dilution at higher exhaust flows, the fact that some of the exhaust bypasses throttle 164 through aspirator 168 may have minimal impact.

In some embodiments (as depicted), an ejector 168 may be arranged in bypass passage 165. A motive flow of exhaust gas through ejector 168 may be harnessed to generate vacuum at a suction port of ejector 168. The suction port of ejector 168 may be coupled with, and stored in, vacuum reservoir 177. The stored vacuum can then be supplied to one or more vehicle system vacuum consumers, such as a brake booster, vacuum-actuated valves, etc. A vacuum sensor 192 may be coupled to vacuum reservoir 177 to provide an estimate of available vacuum. In some examples, exhaust gas may flow from an inlet of ejector 168 (on the intake passage side of the ejector) to an outlet of ejector 168 (on the exhaust passage side of the ejector). In addition to vacuum from ejector 168, vacuum reservoir 177 may be coupled with one or more additional vacuum sources such as other ejectors arranged within vehicle system 106, electrically-driven vacuum pumps, engine-driven vacuum pumps, etc. A check valve may be placed between vacuum reservoir 177 and ejector 168 to prevent loss of vacuum in vacuum reservoir 177.

Depending on the position of exhaust throttle 164 and EGR valve 159, some or all of the exhaust gas exiting catalyst 170 may bypass the exhaust backpressure valve, enter the EGR passage and flow through bypass passage 165, providing a motive flow through ejector 168. For example, when exhaust throttle 164 is open and EGR valve 159 is closed, the exhaust throttle does not restrict exhaust flow through exhaust passage 145, and little or none of the exhaust flowing in exhaust passage 145 downstream of catalyst 170 bypasses the exhaust throttle via passage 165 (depending on the quantity of exhaust flow and relative diameters of passages 145 and 165). When the exhaust throttle is partially open and the EGR valve is closed, depending on the quantity of exhaust flow and relative diameters of passages 145 and 165, some exhaust may flow around the exhaust throttle while the remainder of the exhaust is diverted through ejector 168 via passage 165, bypassing the exhaust throttle. When the exhaust throttle is fully closed and the EGR valve is closed, all exhaust flow is directed into passage 165. When the EGR valve is open, based on the opening of the EGR valve, at least a portion of the exhaust gas exiting catalyst 170 may bypass the exhaust backpressure valve, enter the EGR passage, and be recirculated into intake passage 142. A position of the exhaust throttle and the EGR valve may be adjusted to operate the engine system in one of multiple operating modes. In doing so, EGR and engine heating requirements may be met while also advantageously generating vacuum at exhaust ejector 168.

In some embodiments (as depicted), vehicle system 106 further includes a high-pressure EGR (HP-EGR) system 171. HP-EGR system 171 includes an EGR passage 173 that couples exhaust passage 145, upstream of turbine 154 with air intake passage 142, downstream of compressor 152 and upstream of charge air cooler 184 and intake throttle 182. An EGR cooler 172 arranged in EGR passage 173 cools exhaust gas flowing there-through. A position of EGR valve 179, located in EGR passage 173 on the intake passage side of EGR cooler 172, may be adjusted by controller 120 to vary an amount and/or rate of exhaust gas recirculated from the exhaust passage to the intake passage via the HP-EGR system. In some embodiments, one or more sensors may be positioned within HP-EGR passage 173 to provide an indication of one or more of a pressure, temperature, and air-fuel ratio of exhaust gas recirculated through the HP-EGR passage.

Vehicle system 106 further includes a cabin heating circuit 50. As shown, cabin heating circuit 50 includes a heater core 52, a circulation pump 54, coolant line 56, and a coolant reservoir. The coolant reservoir may be a relatively large volume of coolant, and may be the engine 100 in one example. In another example, the reservoir may be a separate tank or reservoir, such as coolant reservoir 60 (e.g., the coolant reservoir may be a degas tank or coolant storage tank). Heater core 52 receives coolant from EGR cooler 162 via coolant line 56. Circulation pump 54 is configured to pump coolant from a coolant reservoir to the EGR cooler 162 and the heater core 52. The circulation pump 54 may be placed anywhere in series with the EGR cooler and heater core. Circulation pump 54 may include a motor that is activated via a signal from controller 120, for example. In some examples, circulation pump 54 may be configured to adjust a flow rate of the coolant being pumped from EGR cooler 162 to heater core 52, based on feedback from temperature sensor 58a positioned at the inlet of the heater core 52 and/or based on feedback from temperature sensor 58b positioned at the outlet of the heater core 52, for example. A fan or blower (not shown) may blow air over the heater core 52 and into the vehicle cabin in order to heat the vehicle cabin. As shown, after exiting the heater core 52, the coolant is routed to one or more of the engine 100 and the coolant reservoir 60. In some examples, as shown by the dotted line 59, the coolant may be routed through engine 100 and the coolant reservoir 60. Coolant routed through the engine 100 may be routed through one or more coolant jackets or sleeves positioned in the engine block, for example. Additional coolant lines, pumps, radiators, thermostats, etc., may be present and configured to pass coolant through the engine and/or radiator, based on engine temperature.

During engine warm-up conditions where the engine is below a threshold temperature (e.g., below a light-off temperature of a catalyst in the exhaust system), the engine 100 and/or coolant reservoir 60 may act to store a relatively large volume of cold coolant, as the coolant is cooled after passing through the heater core and is not heated up by the engine (as the engine is still cold). As such, to maximize heat transfer to the vehicle cabin, the flow rate of the coolant entering the heater core (after being heated by the EGR cooler) may be adjusted based on the temperature drop across the heater core and a relationship between heater core temperature drop and the flow rate of the coolant (which may be based on various system parameters, such as cabin heater demand, blower speed, etc.) to provide a flow rate that maximizes heat transfer to the vehicle cabin. The coolant flow rate that maximizes heat transfer to the vehicle cabin during engine warm-up conditions may not be the maximum flow rate in some conditions.

In this way, the depicted system yields both on-demand exhaust heat recovery and on-demand vacuum generation at the cost of increased exhaust back pressure (only during demand). While exhaust heat recovery is known, the above-described arrangement of exhaust heat recovery serves cabin heating first and only does engine heating as a lower priority. As such, there are three functions that rely on exhaust pressure. The first function is EGR. Specifically, EGR relies on a minimum back pressure to flow at the present engine condition and EGR flow rate demand. Secondly, exhaust heat recovery relies on a certain backpressure to achieve its heat transfer objective. Finally, the ejector relies on a given exhaust backpressure to achieve a given pump down rate. The controller uses an arbitration strategy that chooses an exhaust backpressure based on the priorities and restrictions of the total system enabling the various demands to be met.

Engine 100 may be controlled at least partially by a control system 140 including controller 120 and by input from a vehicle operator via an input device (not shown). Control system 140 is configured to receive information from a plurality of sensors 160 (various examples of which are described herein) and sending control signals to a plurality of actuators 180. As one example, sensors 160 may include exhaust gas oxygen sensor 126 coupled to exhaust manifold 148, MAP sensor 121 coupled to intake manifold 144, exhaust catalyst temperature sensor 117, exhaust pressure sensor 119 located upstream of catalyst 170 in tailpipe 135, exhaust temperature sensor 128 and exhaust pressure sensor 129 located downstream of catalyst 170 in tailpipe 135, heater core inlet temperature sensor 58a, heater core outlet temperature sensor 58b, and vacuum sensor 192 arranged in vacuum reservoir 177. Various exhaust gas sensors may also be included in exhaust passage 145 downstream of catalyst 170, such as particulate matter (PM) sensors, NOx sensors, oxygen sensors, ammonia sensors, hydrocarbon sensors, etc. Other sensors such as additional pressure, temperature, air/fuel ratio and composition sensors may be coupled to various locations in the vehicle system 106. As another example, actuators 180 may include fuel injector 166, exhaust throttle 164, EGR valve 159, circulation pump 54 (e.g., a motor of the circulation pump) and intake throttle 182. Other actuators, such as a variety of additional valves and throttles, may be coupled to various locations in vehicle system 106. Controller 120 may receive input data from the various sensors, process the input data, and trigger the actuators in response to the processed input data based on instruction or code programmed therein corresponding to one or more routines. Example control routines are described herein with regard to FIGS. 2-4. Circulation pump 54 may be replaced with a pump driven with a constant power but throttled to limit the flow rate, in some examples.

While FIG. 1 includes an exhaust throttle to throttle a less-restrictive path (e.g., the exhaust passage) and push the exhaust gas into a more-restrictive path (e.g., the EGR passage), other configurations for routing the exhaust gas through the EGR cooler are possible. For example, a diverter valve may directly pass the exhaust gas through the EGR passage and into the EGR cooler.

Thus, the system of FIG. 1 provides for a vehicle system, comprising: an engine including an intake and an exhaust; an exhaust gas recirculation (EGR) passage coupling the exhaust to the intake, the EGR passage including an EGR cooler and an EGR valve; an EGR bypass coupled across the EGR cooler; a cabin heating system including a heater core and a circulation pump configured to pump coolant from the EGR cooler to the heater core; and an exhaust throttle positioned in the exhaust downstream of an inlet of the EGR passage and upstream of an outlet of the EGR bypass.

The system further comprises a controller including instructions to, during a cabin heating mode, close the exhaust throttle and the EGR valve to push throttled exhaust through the EGR cooler and back to the exhaust via the EGR bypass to heat the EGR cooler. The cabin heating mode may be initiated in response to one or more of engine temperature being below a threshold, ambient temperature being below a threshold, heater core temperature being below a threshold, and a cabin heating demand above a threshold, provided, for example, based on a heating request from a vehicle operator or passenger.

The controller includes further instructions to adjust a flow rate of the coolant based on a heater core inlet temperature. This may include deactivating the circulation pump when the heater core inlet temperature is below a threshold temperature and activating the circulation pump when the heater core inlet temperature is above the threshold temperature.

FIG. 2 is a flow chart illustrating a method 200 for providing heat to a vehicle cabin. Method 200 may be carried out by a controller, such as controller 120, according to instructions stored thereon in order to recover exhaust heat via an EGR cooler (such as EGR cooler 162) and provide the heat to a cabin heating system heater core (such as heater core 52).

At 202, the method includes estimating engine operating conditions. This may be include measuring and/or inferring conditions such as engine temperature, exhaust temperature and pressure, barometric pressure, engine speed, boost level, manifold pressure, manifold air flow, vehicle cabin heat demand, etc. At 204, based on the estimated operating conditions, an EGR requirement of the engine may be determined. For example, an amount of engine dilution or residuals required to improve engine performance and combustion stability may be determined. Based on the determined EGR requirement, an EGR valve position may be determined. In particular, an opening of the EGR valve may be determined based on the EGR requirement, the EGR valve opening increased (that is, the EGR valve shifted to a more open position) as the EGR requirement increases.

At 206, it is determined if operation in an exhaust heat recovery mode is indicated. During the exhaust heat recovery mode, as will be explained in more detail below, exhaust temperature may be increased by closing an exhaust throttle (e.g., exhaust throttle 164) downstream of an EGR passage (such as EGR passage 163). The exhaust is then routed through an EGR cooler positioned in the EGR passage, and depending on the position of an EGR valve downstream of the EGR cooler, either to the engine intake or to the engine exhaust via an EGR bypass. By throttling the exhaust, the temperature of the exhaust gas increases, which may act to increase the temperature of a catalyst upstream of the exhaust throttle and increase the amount of heat available to reject into coolant at the EGR cooler. Because the EGR cooler is in thermal contact with the cabin system heater core and engine coolant system, the temperature of the heater core and the engine may be increased when the exhaust throttle is closed.

Thus, operation in the exhaust heat recovery mode may be indicated based on one or more operating parameters. In one example, the engine may be operated in exhaust heat recovery mode when engine temperature is below a threshold and/or when vehicle cabin heat demand is above a threshold. During these conditions, rapid heating of the vehicle cabin may be desired, and thus exhaust heat may be recovered to heat the heater core. In another example, the exhaust heat recovery mode may be indicated when the cabin heating system heater core inlet temperature is below a threshold temperature. In other examples, the exhaust heat recovery mode may be indicated when the ambient temperature is below a threshold temperature, a catalyst temperature is below a threshold (e.g., catalyst light-off temperature), and/or when an EGR cooler outlet temperature is below a threshold.

If an exhaust heat recovery mode is not indicated, method 200 proceeds to 208 to adjust the exhaust throttle and EGR valve based on EGR demands. For example, the exhaust throttle may be adjusted to provide a desired amount of exhaust backpressure needed to drive the EGR into the engine intake. Method 200 then returns.

If the exhaust heat recovery mode is indicated, method 200 proceeds to 210 to move the exhaust throttle to a closed position and route at least a portion of the exhaust to the EGR cooler. In one example, closing the exhaust throttle includes fully closing the exhaust throttle. In another example, closing the exhaust throttle includes moving the exhaust throttle from the current position to a more closed position. By closing the exhaust throttle, an exhaust backpressure may be increased, thereby increasing an exhaust temperature, which assists in expediting exhaust catalyst and EGR cooler heating. In addition, during the exhaust heat recovery mode, and while the exhaust throttle is closed, method 200 may include retarding ignition spark timing at 212. By retarding spark timing, the exhaust temperature may be further increased, further assisting in expediting exhaust heating. An amount of spark retard applied may be adjusted based on the temperature of the exhaust catalyst, for example, or based on the temperature of the heater core. For example, as a difference between the exhaust catalyst temperature and the threshold temperature increases, more spark retard may be applied (as long as combustion stability is not degraded).

The exhaust heat recovery mode may include, at 214, moving the EGR valve to a closed position and routing exhaust through the EGR bypass after passing through the EGR cooler. In some examples, the EGR valve may be fully closed, while in other examples, the EGR valve may be moved to a partially closed position. By closing the EGR valve, the exhaust that would otherwise be routed to the engine intake is routed through the EGR bypass and back to the exhaust. In this way, only the requested amount of EGR (which may include, particularly during a cold engine start, no EGR) is delivered to the engine intake, while still passing throttled exhaust through the EGR cooler to heat the EGR cooler. When included, vacuum may be generated via an ejector positioned in the EGR bypass.

At 216, method 200 includes adjusting a coolant flow rate of a heater core circulation pump. In one example, the coolant flow rate may be adjusted based on a temperature of the heater core, as indicated at 217. In order to expedite cabin heating, the heater core of the cabin heating system is provided with heat rejected from the exhaust into the EGR cooler via coolant pumped from the EGR cooler to the heater core by the circulation pump. During this mode, heater core heating is prioritized over EGR cooling, and as such, the coolant flow rate may be adjusted in order to provide the heater core with hot coolant from the EGR cooler and maintain the heater core at a target temperature. Thus, in some examples, the heater core circulation pump may be activated only when coolant exiting the EGR cooler is greater than a threshold temperature, as indicated at 218. Further, as indicated at 220, the coolant is routed from the EGR cooler to the vehicle cabin heating system heater core when the circulation pump is activated. Adjusting the flow rate of the circulation pump may include increasing the flow rate when the heater core temperature (e.g., heater core inlet temperature) is below a threshold temperature. Adjusting the flow rate may also include increasing the flow rate when the coolant temperature exiting the EGR cooler is greater than a threshold temperature and decreasing the flow rate when the coolant temperature is below the threshold temperature. In this way, only heated coolant is delivered to the heater core, maximizing heating of the heater core. The threshold coolant temperature may be a suitable temperature, such as greater than the temperature of the heater core, equal to greater than the heater core target temperature, or other threshold temperature.

In some examples, the circulation pump is not operated at a flow rate faster than the heat can be extracted from the coolant at the heater core. If the pump runs too slow, little or no heat transfer may occur. Similarly, if the pump runs too fast, little heat transfer occurs. At an optimal speed, it moves the most heat from the exhaust to the cabin. When the delta T across the heater core multiplied by the flow rate is at a maximum, then the coolant flow rate is optimal. Thus, in some embodiments, the coolant flow rate may be adjusted based on the temperature drop across the heater core and based on the flow rate of the coolant, as indicated at 221 and described in more detail below with respect to FIG. 4.

In some embodiments, a thermostat may be provided upstream or downstream of the heater core circulation pump. The thermostat may block flow of coolant to the heater core until the coolant reaches a threshold temperature. If a thermostat is provided, rather than adjust a flow rate of the circulation pump, the pump may be operated at maximum flow rate. Since a thermostat does not sense the temperature drop across the heater core, it cannot set the optimal flow rate. However, it could preclude pumping insufficiently warm coolant to the heater core.

At 222, method 200 includes determining if a temperature condition has been met. The temperature condition may be based on the operating conditions that indicated the engine be operated in the exhaust heat recovery mode. For example, if the exhaust heat recovery mode was indicated because engine temperature was below a threshold temperature and a cabin heat demand was greater than a threshold demand, the temperature condition may include one or more of the engine temperature reaching the threshold temperature and the cabin heating system heater core reaching a target temperature (the target temperature based on the cabin heating demand). In another example, the temperature condition may include the exhaust catalyst reaching light off temperature. If the temperature condition has not been met, method 200 returns to 210 to continue to throttle the exhaust and route heated coolant from the EGR cooler to the heater core.

If the temperature condition has been met, method 200 proceeds to 224 to move the exhaust throttle towards an open position. In one example, the exhaust throttle may be fully opened. In an alternate example, after the temperature of the temperature condition is met, the exhaust throttle may be adjusted based on the catalyst temperature, EGR cooler outlet temperature, and/or the heater core temperature, with the exhaust throttle shifted from a more closed position to a more open position as the catalyst, EGR cooler, or heater core temperature increases.

At 226, the EGR valve may also be opened (or moved to a more open position) if EGR is required. In particular, an opening of the EGR valve may be adjusted based on the engine's EGR (and engine dilution) requirement. Further, at 228, spark ignition timing may be advanced if spark ignition timing was retarded at 212.

In this way, a high exhaust heat rate commanded, for example, by retarding spark ignition timing. Then, the exhaust may be throttled to push exhaust through EGR cooler, resulting in the EGR cooler serving as an exhaust-to-coolant heat exchanger. Finally, the heater core circulation motor may be controlled to deliver coolant above a threshold temperature to the heater core. Thus, the cabin system heater core may be rapidly heated without diffusing the exhaust heat to the entire coolant system and contacting surfaces.

Coordination of exhaust throttling and heater core circulation pump adjustments to expedite heater core heating is now shown with reference to the example of FIG. 3. Specifically, map 300 depicts exhaust throttle adjustments at graph 302, an EGR cooler outlet temperature at graph 304, a heater core temperature at graph 306, and heater core circulation pump status at graph 308. All graphs are plotted against time (along the x-axis).

At t1, an engine may be started and warmed-up. In particular, in response to a temperature being below a threshold (such as engine temperature or heater core temperature), an engine cold-start may be initiated at t1. During the engine cold-start, the engine is operated with each of an exhaust throttle (302) and an EGR valve closed. In the depicted example, the exhaust throttle and the EGR valve are fully closed, however it will be appreciated that in alternate examples, the exhaust throttle and the EGR valve may be moved to a more closed position. Closing the exhaust throttle causes an exhaust backpressure estimated upstream (e.g., immediately upstream) of the exhaust throttle to increase as well as the exhaust temperature to increase.

With the exhaust throttle closed, at least a portion of throttled exhaust gas is diverted into an EGR passage (or EGR take-off) including the EGR valve and an EGR cooler positioned upstream of the EGR valve. In the present example, each of the EGR valve and the EGR cooler may be positioned in a low pressure EGR passage, the EGR passage fluidly coupling an engine exhaust, from upstream of the exhaust throttle and downstream of the catalyst to an engine intake, upstream of an intake compressor. The increased flow of heated exhaust gas through the EGR cooler causes a rise in temperature at the EGR cooler (as shown by an increase in EGR cooler outlet temperature, 304). This in turn causes increased heat rejection at the EGR cooler, the heat rejected to the coolant of the EGR cooler.

Before the EGR cooler outlet temperature (e.g., coolant temperature) reaches a threshold temperature (T_COOLANT), the circulation pump is deactivated (308). In this way, the coolant may be retained in the EGR cooler rather than being pumped to the heater core. As such, the coolant may be rapidly heated by the EGR cooler. Once the coolant reaches the threshold temperature at time t2, the circulation pump is activated and operated at maximum flow rate. The heated coolant is pumped to the heater core and the temperature of the heater core begins to increase (306).

The circulation pump flow rate may be adjusted based on the temperature of the coolant at the EGR cooler. As engine running time increases, and more and more exhaust heat becomes available, one would expect the coolant rate to increase. Thus when a little heat is put out, a low flow rate is needed, when lot of heat is put out, the coolant flow rate would be high. (If there is not much heat in the water, it works against the objective to pump water at a high rate.) At time t3, a temperature condition is met. In the illustrated example, the temperature condition includes the heater core reaching a target temperature (T_CORE). The exhaust throttle is moved towards an open position (e.g., fully open). It will be appreciated that while the depicted example shows the exhaust throttle being gradually moved to a more open position after t2, in alternate embodiments, the exhaust throttle may be fully opened at t2. As a result, the exhaust temperature decreases and the EGR cooler outlet temperature also decreases. The heater core circulation pump flow rate may be adjusted (e.g., decreased) based on the heater core being at the target temperature and/or the EGR cooler outlet temperature decreasing. The flow rate of the circulation pump may continue to be adjusted (e.g., increased or decreased) to maintain the heater core target temperature.

Optionally, the EGR valve (not shown) may be opened after the exhaust throttle has been opened to provide a desired amount of exhaust gas recirculation. As such, the EGR amount required may be determined based on engine operating conditions and engine dilution requirements. For example, if more engine dilution is required, the EGR valve may be moved to a more open position.

The heated coolant then leads to an increase in heater core temperature which helps to increase engine efficiency at cold-start while also assisting in heating the exhaust catalyst. With the EGR valve also closed, the heated exhaust gas diverted through the EGR cooler is then flowed from the EGR cooler outlet into a bypass passage which connects back to the engine exhaust, downstream of the exhaust throttle. From there, the exhaust gas is vented to the atmosphere. As such, the combination of closing the exhaust throttle and the EGR valve (to increase exhaust backpressure and temperature and heat rejection at the EGR cooler) expedites heater core heating. In particular, as depicted, the approach enables the heater core temperature to reach the target (T_CORE) in a smaller amount of time than would be possible without closing both valves.

Previous systems have typically been designed such that if the coolant is hot, it is pumped (at maximum flow rate, for example). This is done with either thermostats or temperature controlled pump or valves. However, in the system described herein, a pumping rate is selected that optimizes heat transfer. To compute the optimal flow rate for maximum heat transfer the change in temperature across the heat exchanger is determined. This rate may not be the maximum or minimum flow rate in some examples. That said, if the heater core is above a threshold temperature, no pumping may be required. Once the outlet temperature of the heater core is near a target temperature, the pumping rate can be decreased. In other words, if the outlet temperature is sufficiently high, pumping may be stopped.

Thus, the method as described above with respect to FIGS. 2 and 3 provides for a method for heating a vehicle cabin comprising closing an exhaust throttle while diverting at least a portion of throttled exhaust gas through an exhaust gas recirculation (EGR) cooler coupled upstream of the throttle; and transferring heat from the EGR cooler to a heater core configured to provide heat to the vehicle cabin.

The method may include wherein transferring heat from the EGR cooler to the heater core comprises operating a heater core circulation pump to pump the coolant from the EGR cooler through the heater core. The method may further comprise adjusting a flow rate of the heater core circulation pump based on an inlet temperature of the heater core and routing the coolant from the heater core to the engine before returning the coolant to the EGR cooler.

Diverting the portion of the throttled exhaust gas through the EGR cooler may include diverting a portion of the throttled exhaust gas through the EGR cooler located inside an EGR passage while maintaining an EGR valve in the EGR passage at a more closed position, the EGR passage fluidly coupling an engine exhaust from upstream of the exhaust throttle to an engine intake, upstream of an intake compressor. In one example, the EGR passage is a low pressure EGR passage.

The diverting may further include routing the portion of throttled exhaust gas from an outlet of the EGR cooler to the engine exhaust, downstream of the exhaust throttle, via a bypass passage. The exhaust throttle may be coupled downstream of an exhaust catalyst, and the method may further comprise, while a temperature of the exhaust catalyst is below a threshold temperature and while the exhaust throttle is closed, retarding spark ignition timing, an amount of spark retard adjusted based on the temperature of the exhaust catalyst.

The method may further comprise, after the temperature of the exhaust catalyst is above the threshold temperature, maintaining the exhaust throttle closed while advancing spark ignition timing. In another example, the method may further comprise, after the temperature of the exhaust catalyst is above the threshold temperature, adjusting the exhaust throttle based on an inlet temperature of the heater core. The adjusting may include, as the inlet temperature of the heater core increases, shifting the exhaust throttle from a more closed position to a more open position.

In an embodiment, a method comprises adjusting a flow rate of coolant pumped from an exhaust gas recirculation (EGR) cooler to a cabin heating system heater core based on an inlet temperature of the heater core; and during select conditions, throttling exhaust gas to increase exhaust pressure and to route the exhaust gas through the EGR cooler, heat from the exhaust gas to the heater core via the EGR cooler. The select conditions may comprise one or more of only when an exhaust catalyst temperature is below a first threshold temperature and when the inlet temperature of the heater core is below a second threshold temperature.

Throttling the exhaust gas may comprise closing an exhaust throttle positioned in the engine exhaust, and the method may further comprise when an EGR valve downstream of the EGR cooler is closed, routing the throttled exhaust from the EGR cooler back to the engine exhaust, downstream of the exhaust throttle, via an EGR bypass.

The method may further comprise when the EGR valve is at least partially open, routing exhaust from the EGR cooler to an engine intake. Adjusting a flow rate of coolant based on the inlet temperature of the heater core may further comprise operating a heater core circulation pump to route coolant to the heater core only when a temperature of the coolant at an outlet of the EGR cooler is above a threshold temperature.

Turning now to FIG. 4, a method 400 for adjusting a flow rate of coolant into a heat exchanger is provided. Method 400 may be carried out during the execution of method 200 of FIG. 2, as described above, in order to transfer heat from an exhaust system to a vehicle cabin via a heater core (e.g., heater core 52), or method 400 may be carried out independently of method 200. While method 400 is described as occurring with the EGR cooler (e.g., EGR cooler 162) and exhaust heat rejection system described above, it is to be understood that method 400 may be carried out with other heat exchangers, such as an EGR cooler, charge air cooler, etc. When carried out independently of method 200, method 400 may be carried out in response to an indication that a vehicle cabin is demanding heat.

At 402, method 400 includes estimating and/or measuring operating conditions. The operating conditions may include, but are not limited to, coolant temperature (measured upstream and/or downstream of the heater core, via temperature sensor 58a and temperature sensor 58b, for example), engine temperature, coolant pump power (such as the power of circulation pump 54), and other conditions. At 404, method 400 includes determining if the system is operating under steady state conditions. In one example, steady state conditions may include a constant coolant temperature into the heater core (e.g., coolant temperature changing by less than a threshold amount, such as 10° C.) and/or a constant heat demand from the vehicle cabin. Further, steady state conditions may include the engine reaching stable operating temperature. Thus, non-steady state conditions may include a warm up period where the temperature of the coolant changes by more than the threshold amount and/or may include an engine warm-up period where the engine temperature is less than a threshold temperature (such as catalyst light-off temperature or standard engine operating temperature).

If the system is operating under steady state conditions, method 400 proceeds to 406 to operate the coolant pump at maximum flow rate. During steady state conditions where the characteristics of the cabin heating system and/or engine coolant and exhaust systems are not changing, maximum heat transfer to the vehicle cabin via the heater core may be provided by the coolant flowing through the heater core at its maximum flow rate. Thus, during steady state conditions (e.g., when the engine is not in a warm-up phase), the coolant pump may be operated to flow coolant at the maximum flow rate, and then method 400 returns.

However, during non-steady state conditions, the flow rate of coolant that maximizes heat transfer to the cabin is not necessarily the maximum flow rate. If the temperature downstream of the heater core is near the temperature upstream of the heater core, the flow rate may be decreased because little heat is being routed to the cabin. Thus, the flow rate may be optimized to the system characteristics to provide maximum heat transfer to the cabin.

Accordingly, if it is determined at 404 that the system is not operating under steady state conditions, method 400 proceeds to 408 to determine the coolant pump power and temperature drop across the heater core. The pump power may be determined in order to determine the flow rate of the coolant (flow is determined as a function of pump power). The controller commands the pump power and thus has knowledge of it. To determine the temperature drop, the temperature of the coolant may be directly measured at two points (upstream and downstream of the heater core) and the temperature difference computed. In some examples, the downstream temperature may be estimated based on another temperature reading, such as from temperature sensors in the heater duct.

At 410, method 400 includes determining a system characteristic. The system characteristic may be the relationship between the temperature drop across the heater core and the flow rate of coolant into the heater core. That is, the amount of heat transferred via the heater core (e.g., which can be determined by the temperature drop across the heater core) is a function of the flow rate of coolant into the heater core. However, various system parameters may affect the relationship between the temperature drop and the flow rate. For example, the cabin heat blower setting, cabin temperature, and/or initial coolant temperature may all impact how much heat is extracted by the heater core at a given flow rate. Rather than measure all the variables that may affect the relationship between the flow rate and temperature drop, the system characteristic may be determined.

Figure 5:
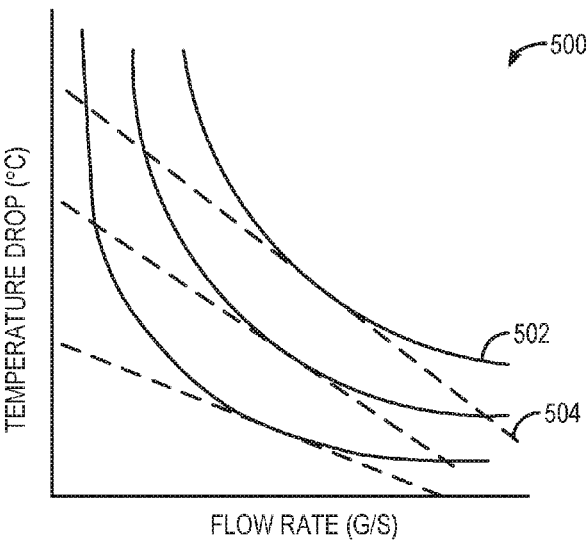
FIGS. 5-6 show diagrams illustrating approaches for selecting a flow rate for maximizing heat transfer to a vehicle cabin according to embodiments of the present disclosure.

Once the system characteristic is determined, the flow rate for maximum heat transfer to the cabin may be selected for that given characteristic, as indicated at 412. To determine the flow rate for maximum heat transfer (also referred to as cabin power) for a given system characteristic that the system is currently operating under, various control approaches may be used. First, a searching algorithm may be devised that finds the power maxima (e.g., maximum heat transfer to the cabin) in real time as the system characteristic changes. One example of this approach is illustrated in FIG. 5, which shows a diagram 500 illustrating constant cabin power hyperbolas tangent to system characteristic lines. The system characteristic lines (such as line 504) illustrate the relationship between temperature drop (plotted on the vertical axis) and flow rate (plotted on the horizontal axis), and the curves of constant cabin power (such as curve 502) are plotted tangent to a respective line.

Figure 6:
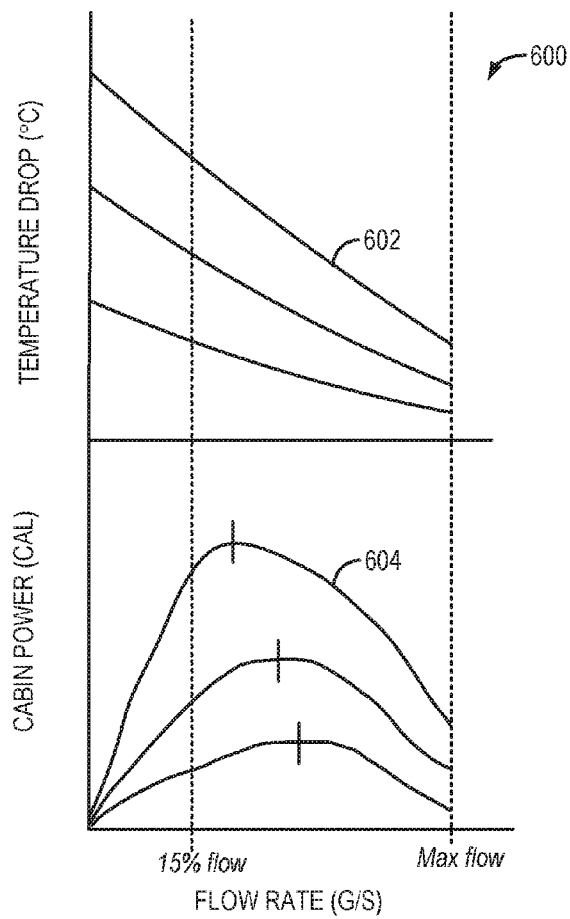

A non-recursive approach includes mapping the system characteristic by varying flow rate (piece wise linear) and then finding which of those flow rates yield the highest cabin heat flux (i.e. power) and selecting that operating point (until the system characteristic is re-mapped). An example of this approach is illustrated in FIG. 6, which shows a diagram 600 illustrating optimum flow rate shifts as system characteristics shift. This approach recognizes that as the system characteristic changes, the optimal flow rate changes, and controls the flow rate based on a rough map of the system characteristic. To rough map the system characteristic, the temperature drop at max flow rate and at, for example, 15% flow rate may be measured and plotted to give a system characteristic line (such as line 602). Power curves (such as power curve 604) may then be computed and each maxima found.

Thus, returning to method 400 of FIG. 4, the flow rate for maximum heat transfer may be selected for a given system characteristic. While multiple inputs may influence the relationship between the flow rate and heat transfer, because the system is mapped at a particular moment in its thermal history, the method need know nothing other than the flow rate and temperature drop. Once ΔT*flow rate is a maximum, maximum heat transfer to the cabin is achieved. Further, as explained above and indicated at 414, the flow rate may be adjusted as the system characteristic changes. In one example, as the temperature drop across the heater core increases, the flow rate may be increased and as the temperature drop across the heater core decreases, the flow rate may be decreased.

To control the flow rate, the input power to the circulation pump may be controlled, but even if a pump set for maximum power were throttled, it would achieve maximum heat transfer to a particular heat exchanger. In this case, that heat exchanger is a heater core, but it could be other heat exchangers such as: radiators, EGR coolers, oil coolers, transmission heaters, charge air coolers, etc.

Thus, in one embodiment, a method for an engine comprises pumping coolant from a coolant reservoir to an exhaust component and then to a heater core, the coolant heated by the exhaust component; and during engine warm-up conditions, adjusting a flow rate of coolant into a heater core to maximize heat transfer to a vehicle cabin. Adjusting the flow rate of coolant into the heater core to maximize heat transfer to the vehicle cabin may comprise flowing the coolant at less-than-maximum flow rate even if the heat demand of the vehicle cabin is at a maximum heat demand.

Adjusting the flow rate of coolant into the heater core may comprise adjusting the flow rate to a desired flow rate of coolant associated with a given operating condition. In an example, adjusting the flow rate comprises adjusting a flow rate of the circulation pump. The engine warm-up conditions may comprise a temperature of the engine being below a threshold temperature, and the method may further comprise, when the temperature of the engine is above the threshold temperature, maintaining a constant flow rate of coolant into the heater core.

The method may further comprise determining the given operating condition based on a relationship between a measured temperature drop across the heater core and a commanded flow rate of coolant into the heater core. The desired flow rate may provide maximum heat transfer to the vehicle cabin for the given operating condition. The exhaust component may be an exhaust gas recirculation (EGR) cooler, the reservoir may be the engine, and the method may further comprise routing the coolant into the heater core from the EGR cooler via a circulation pump, the coolant from the heater core routed through the engine before returning to the EGR cooler.

The method may further comprise closing an exhaust throttle while diverting at least a portion of throttled exhaust gas through the EGR cooler coupled upstream of the throttle to heat the EGR cooler, heat from the EGR cooler transferred to the coolant. Diverting the portion of the throttled exhaust gas through the EGR cooler may include diverting a portion of the throttled exhaust gas through the EGR cooler located inside an EGR passage while maintaining an EGR valve in the EGR passage at a more closed position, the EGR passage fluidly coupling an engine exhaust from upstream of the exhaust throttle to an engine intake, upstream of an intake compressor.

Another embodiment includes a vehicle system comprising: an engine including an intake and an exhaust; an exhaust gas recirculation (EGR) passage coupling the exhaust to the intake, the EGR passage including an EGR cooler and an EGR valve; a cabin heating system including a heater core and a circulation pump configured to pump coolant from the EGR cooler to the heater core; and a controller including instructions to, during a cabin heating mode, adjust a flow rate of coolant into a heater core based on a temperature drop across the heater core and a flow rate of coolant into the heater core.

The controller may include instructions to adjust the flow rate of coolant to a desired flow rate that provides a maximum cabin power, the maximum cabin power a function of the temperature drop across the heater core and the desired flow rate. The flow rate may be determined by the controller based on a power of the circulation pump.

The system may further comprise an EGR bypass coupled across the EGR cooler; and an exhaust throttle positioned in the exhaust downstream of an inlet of the EGR passage and upstream of an outlet of the EGR bypass. The controller may include instructions to, during the cabin heating mode, close the exhaust throttle and the EGR valve to push throttled exhaust through the EGR cooler and back to the exhaust via the EGR bypass to heat the EGR cooler.

A further embodiment relates to a method, comprising: pumping coolant through a cabin heating circuit comprising an EGR cooler, a cabin heating system heater core, and an engine; during steady state conditions where a temperature of the coolant into the heater core is above a threshold temperature, operating the circulation pump at maximum power to flow coolant into the heater core at a maximum flow rate; and during non-steady state conditions where the temperature of the coolant into the heater core is below the threshold temperature, adjusting the circulation pump to flow coolant into the heater core at a less-than-maximum flow rate, the less-than-maximum flow rate selected to provide maximum cabin heat.

Adjusting the power of the circulation pump may comprise adjusting the power of the circulation pump based on a temperature drop across the heater core and a flow rate of the coolant into the heater core. The method may further comprise, as the temperature drop increases, adjusting the circulation pump to increase the flow rate and as the temperature drop decreases, adjusting the circulation pump to decrease the flow rate.

The method may further comprise during the non-steady state conditions, throttling exhaust gas to increase exhaust pressure and to route exhaust gas through the EGR cooler to heat the EGR cooler. Throttling the exhaust gas may comprise closing an exhaust throttle positioned in the engine exhaust, and the method may further comprise, responsive to an EGR valve downstream of the EGR cooler being closed, routing the throttled exhaust from the EGR cooler back to the engine exhaust, downstream of the exhaust throttle, via an EGR bypass. The method may further comprise, responsive to the EGR valve being at least partially open, routing exhaust from the EGR cooler to an engine intake.

Thus, if all the coolant is hot (e.g., above the threshold temperature, then the circulation pump is operated at max flow rate, unless it is desired to save pump energy, in which case the pump may be operated fast enough to keep the heater core outlet temperature at a desired temperature. If the coolant is cold, the pump may be operated as fast as possible but not so fast that the temperature coming into the heater core cools off. In other words, if the source heat is infinite, then the pump is operated just enough to keep the heater core outlet near system temperature. If the source heat is limited, the pump is operated at a flow rate that is limited to keep the heater core inlet temperature hot.

In some examples, the steady state conditions may include the temperature of the coolant into the heater core changing (e.g., increasing or decreasing) by at least a threshold amount, where the non-steady state conditions include the temperature of the coolant into the heater core changing by less than the threshold amount.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein. The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for heating a vehicle cabin comprising:
    closing an exhaust throttle while diverting at least a portion of throttled exhaust gas through an exhaust gas recirculation (EGR) cooler coupled upstream of the throttle, the throttle coupled downstream of an exhaust catalyst;
    transferring heat from the EGR cooler to a heater core to provide heat to the vehicle cabin;
    while a temperature of the exhaust catalyst is below a threshold temperature and while the exhaust throttle is closed, retarding spark ignition timing; and
    while diverting exhaust gas through the EGR cooler, generating vacuum by flowing gas through an ejector.

2. The method of claim 1, wherein an amount of spark retard adjusted based on the temperature of the exhaust catalyst while the temperature of the exhaust catalyst is below the threshold temperature.

3. The method of claim 1, wherein the flow through the ejector is exhaust gas flow.

4. The method of claim 1, wherein transferring heat from the EGR cooler to the heater core comprises operating a heater core circulation pump to pump coolant from the EGR cooler through the heater core, and adjusting a flow rate of the heater core circulation pump based on an inlet temperature of the heater core.

5. The method of claim 2, further comprising routing the coolant from the heater core to an engine before returning the coolant to the EGR cooler.

6. The method of claim 1, wherein the ejector is coupled between from an EGR passage downstream of the EGR cooler to the exhaust downstream of the exhaust throttle.

7. The method of claim 1, wherein the engine includes a boosting device.

8. The method of claim 1, further comprising, after the temperature of the exhaust catalyst is above the threshold temperature, maintaining the exhaust throttle closed while advancing spark ignition timing.

9. The method of claim 1, further comprising, after the temperature of the exhaust catalyst is above the threshold temperature, adjusting the exhaust throttle based on an inlet temperature of the heater core.

10. The method of claim 9, wherein the adjusting includes, as the inlet temperature of the heater core increases, shifting the exhaust throttle from a more closed position to a more open position.

11. A vehicle system, comprising:
    an engine including an intake and an exhaust;
    an exhaust gas recirculation (EGR) passage coupling the exhaust to the intake, the EGR passage including an EGR cooler and an EGR valve;
    an EGR bypass coupled across the EGR cooler;
    a cabin heating system including a heater core and a circulation pump configured to pump coolant from the EGR cooler to the heater core;
    an exhaust throttle positioned in the exhaust downstream of an inlet of the EGR passage and upstream of an outlet of the EGR bypass,
    an ejector coupled from the EGR passage downstream of the EGR cooler to the exhaust downstream of the exhaust throttle; and
    a controller including instructions to, while a temperature of an exhaust catalyst is below a threshold temperature and while the exhaust throttle is closed, retard spark ignition timing, an amount of spark retard adjusted based on the temperature of the exhaust catalyst,
    wherein the exhaust throttle is coupled downstream of the exhaust catalyst.

12. The system of claim 1, wherein the controller further including instructions to, during a cabin heating mode, adjust a flow rate of coolant into a heater core based on a determined relationship between a temperature drop across the heater core and the flow rate of coolant into the heater core, the adjustments including coordination of exhaust throttling and heater core circulation pump adjustments.

13. The vehicle system of claim 12, wherein the controller further includes instructions to, during the cabin heating mode, close the exhaust throttle and the EGR valve to push throttled exhaust through the EGR cooler and back to the exhaust via the EGR bypass to heat the EGR cooler.

14. The vehicle system of claim 13, wherein the controller includes further instructions to adjust a flow rate of the coolant based on a heater core inlet temperature.

15. The vehicle system of claim 14, wherein the controller includes further instructions to deactivate the circulation pump when the heater core inlet temperature is below a threshold temperature and activate the circulation pump when the heater core inlet temperature is above the threshold temperature.

16. A method, comprising:
   adjusting a flow rate of coolant pumped from an exhaust gas recirculation (EGR) cooler to a cabin heating system heater core based on an inlet temperature of the heater core;
   during select conditions, throttling exhaust gas to increase exhaust pressure and to route the exhaust gas through the EGR cooler, heat from the exhaust gas transferred to the heater core via the EGR cooler, wherein the flow rate is further adjusted based on a determined change in temperature across the cooler after unthrottling the exhaust gas responsive to a temperature of the heater core reaching a threshold; and
   flowing throttled exhaust gas through an ejector.

17. The method of claim 16, wherein the select conditions comprise one or more of only when an exhaust catalyst temperature is below a first threshold temperature and the inlet temperature of the heater core is below a second threshold temperature, the method further comprising boosting intake air to the engine.

18. The method of claim 16, wherein throttling the exhaust gas comprises closing an exhaust throttle positioned in the engine exhaust, the method further comprising responsive to an EGR valve downstream of the EGR cooler being closed, routing the throttled exhaust from the EGR cooler back to the engine exhaust, downstream of the exhaust throttle, via an EGR bypass.

19. The method of claim 18, further comprising responsive to the EGR valve being at least partially open, routing exhaust from the EGR cooler to an engine intake.

20. The method of claim 16, wherein adjusting a flow rate of coolant based on the inlet temperature of the heater core further comprises operating a heater core circulation pump to route coolant to the heater core only when a temperature of the coolant at an outlet of the EGR cooler is above a threshold temperature.

* * * * *